United States Patent Office 3,418,804
Patented Dec. 31, 1968

3,418,804
DEVICE FOR CONVERTING CALORIFIC ENERGY
INTO MECHANICAL ENERGY
Roelf Jan Meijer and Roland Anton Johan Otto van
Witteveen, Emmasingel, Eindhoven, Netherlands, assignors to North American Philips Company, Inc.,
New York, N.Y., a corporation of Delaware
Filed May 9, 1967, Ser. No. 637,135
Claims priority, application Netherlands, May 11, 1966,
6606406
4 Claims. (Cl. 60—24)

ABSTRACT OF THE DISCLOSURE

The combination of a heat engine and heat source therefor is described. More particularly, there is described a system comprising a hot gas engine and heat supply system therefor comprising a container in the form of a circulation duct, a molten metal fuel in the container, a source of oxidizer fluid for the metal coupled to the container and a pumping system for maintaining the molten metal in a circulating condition. The heater system of the hot gas engine is arranged in heat conducting relationship with the molten circulating metal preferably by the use of a heat exchange system having its heat pick-up unit positioned in the circulation duct at a point remote from the point of injection of the oxidizing fluid.

---

Figure 1:
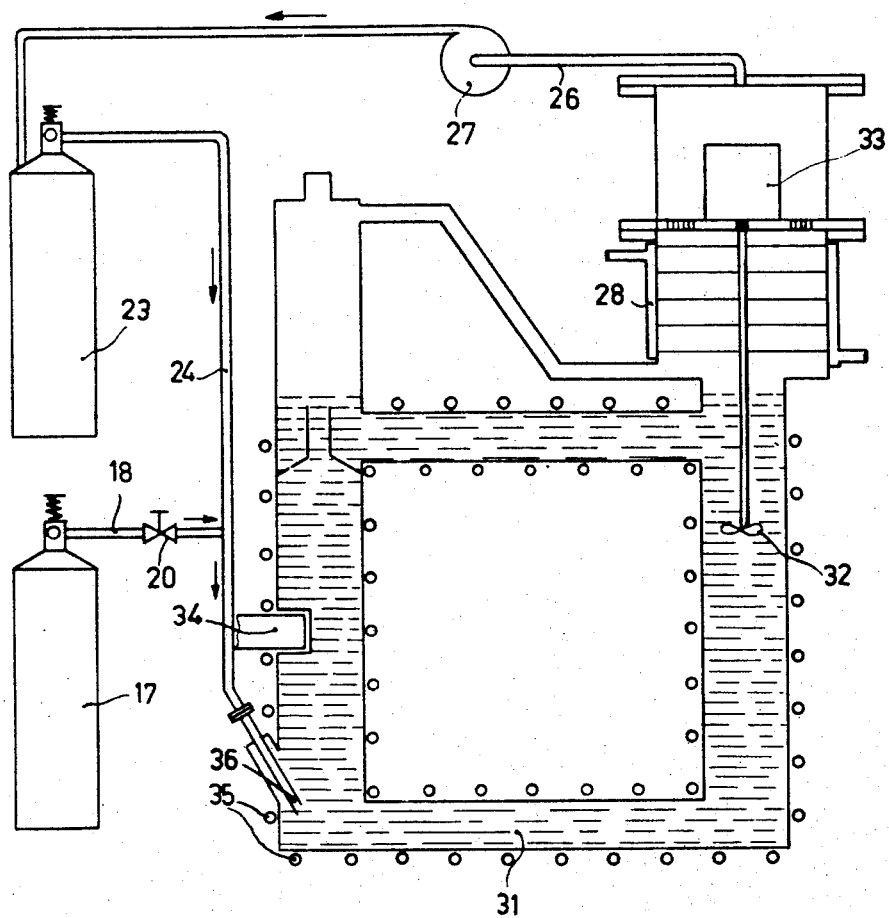

The invention relates to a device for converting calorific energy into mechanical energy, particularly a hot-gas engine, comprising one or more spaces of a lower average temperature in which a working medium can be compressed, as well as one or more spaces of a higher average temperature which communicate with the first-mentioned space and in which the working medium can be expanded, a heat exchanger, preferably a regenerator, being arranged in the communication between each pair of the said spaces, the said device further comprising a heater system for supplying heat to the working medium.

In known devices of the type to which the present invention relates, the heater system for supplying heat to the working medium consists of a burner device to which fuel and air for combustion are supplied. A drawback of this system is that the device can operate only if air for combustion is present in sufficient quantities. A further drawback of this known device is, in circumstances, the fact that combustion gases have to be conducted away. This may be particularly disadvantageous especially when using the device in question in mines. When the device in question is used in constructions for deep-sea research, the dissipation of the combustion gases can be realized only with very great difficulties and large power consumption, including the associated cost, as a result of the high pressure of the surrounding water.

In order to be able to use the devices of the type to which the present invention relates for the above fields of application all the same, it might be possible to use heat accumulators for supplying heat to the working medium. These are containers filled with a mass of material having a large heat capacity of which a quantity of heat can be stored which can be derived therefrom at any desired instant and be supplied to the working medium. A drawback of such heat accumulators is that the enthalpy per unit of volume is comparatively low which results in very bulky constructions, which is not admissible any longer in circumstances.

It is the object of the invention to obviate the above drawbacks and to provide a heater system which can supply heat to the working medium without being dependent upon the ambient circumstances and without the exhaust products having to be conducted away out of the system.

In order to realize this the device according to the invention is characterized in that the heater comprises at least one first container having a metal or a mixture of metals which is liquid at the operating temperature of the working medium, the heater system further comprising at least one second container containing a medium which can react chemically with the liquid in the first container with evolution of heat in such manner that the reaction products are solid and/or liquid at the temperature and pressure prevailing in the first container, the second container communicating through a supply duct with the first container and the system further comprising a control device for the dosed supply of medium from the second container to the first container, the first container being constructed as a circulation duct comprising a circulation pump for circulating the liquid metal or the liquid mixture of metals and the reaction products formed and in which over part of said circulation duct said metal or the mixture of metals together with the reaction products, is in heat exchanging relationship with the working medium of the device.

So in the device according to the invention the two media which react with one another are stored in two separate containers so that, independently of the circumstances in which the device has to operate, heat can always be evolved by bringing the said reaction products together. In addition, the metals and the medium reacting chemically with the metals are chosen to be so that the reaction products are solid and/or liquid so that no gaseous reaction products have to be conducted away out of the system. It has been found that a heater system according to the invention can supply a quantity of heat which is many times larger per unit of volume than can be stored per unit of volume in known heat accumulators.

Due to the fact that the liquid metal in the first container is circulated in a circulation duct a very good heat exchange between the working medium and the liquid metal becomes possible. Furthermore a good mixing of the metal or mixture of metals in the first container and the medium added thereto from the second container is ensured. A further advantage is that the location at which the heat exchange between the working medium and the liquid metal takes place and the location at which the medium from the second container is supplied to the first container can be different. In a further embodiment of the device according to the invention the duct for supplying medium from the second container to the circulation duct debouches at a point which is remote from the part of the duct where the said heat exchange takes place. This prevents any overheating of the point where the heat exchange takes place.

The first container may contain one or more of the metals Li, Na, K, Mg, Al and/or one or more of the rare earth metals. These metals and especially combinations of the said metals have the advantage of being liquid already at comparatively low temperatures and evolving much heat per unit of volume during the reaction.

The medium in the second container may be oxygen, a halogen or a halogen-containing compound, particularly a carbon-halogen compound. Halogens or halogen-containing compounds, when reacted with the metal in the first container, produce a very good evolution of heat per unit of volume.

In a further embodiment a space is present in the circulation duct over the liquid metal or liquid mixture of metals present therein which space is filled with a gas, for example, helium, which does not react chemically with the metals in question. The object of this is to compensate for small volume variations which may occur and to keep the liquid under a given pressure so that the pumping device present in the container can operate effectively. The space which is filled with inert gas may communicate with a device with which a given pressure can be adjusted in the circulation duct.

In another embodiment of the device according to the invention a further circulation duct is provided in which a metal or a mixture of metals, for example, NaK, is circulating, the heater pipes of the motor being bathed by said liquid metal or mixture of metals and said metal or mixture of metals being in heat exchanging relationship at another point with the liquid in the first container. So in this device a larger freedom in arrangement and construction of the heater system and the device in question relative to one another is obtained in which the heat of the heater system is transported to the device by the metal in the further circulation duct.

In order that the invention may readily be carried into effect, a few devices for converting calorific energy into mechanical energy will now be described in greater detail, by way of example, with reference to the accompanying drawings, in which:

FIG. 1 diagrammatically shows not to scale a cross-section view of a heater system for a device for converting calorific energy into mechanical energy in which the heater system is formed by a container in the form of a circulation duct containing a liquid metal or liquid mixture of metals and a second container communicating therewith which contains a medium which chemically reacts with the substance in the first container.

Figure 2:
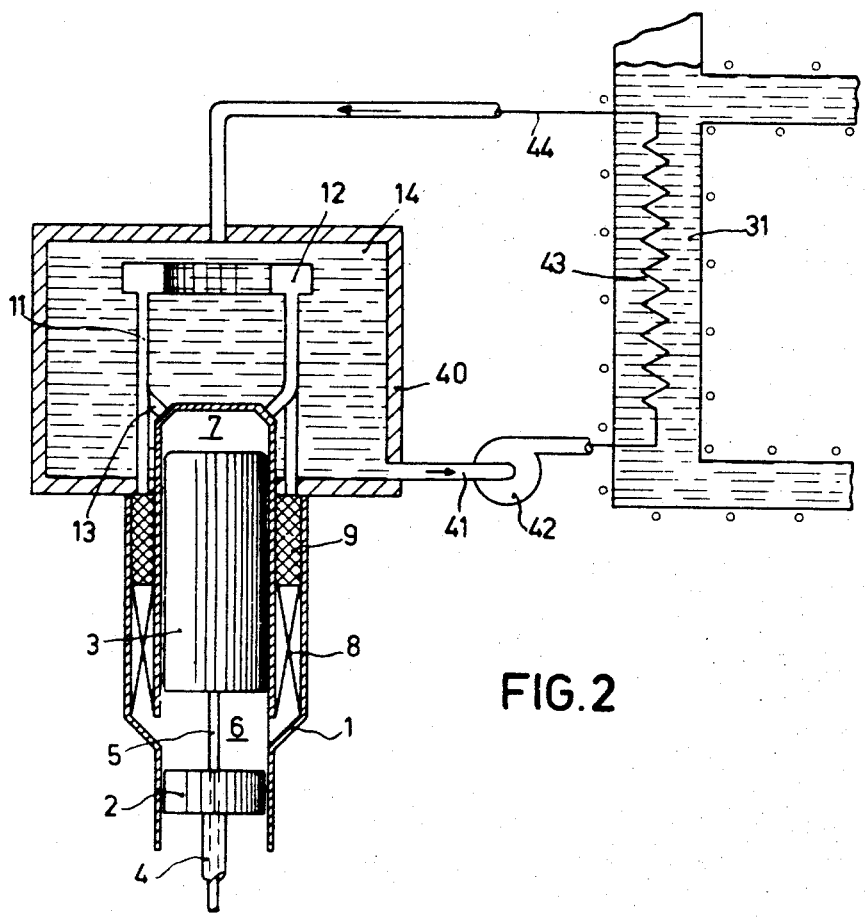

FIG. 2 shows a further embodiment of the device shown in FIG. 1 likewise diagrammatically and not to scale, in which the heat generated in the circulation duct is by means of a circulating heat transfer medium transferred to a hot gas engine.

In FIG. 1 the heater of a hot gas engine is shown diagrammetically at 34. Heat is supplied to the hot gas engine by a heater system, comprising a circulation duct 31. This circulation duct contains a metal or a mixture of metals the melting point of which is such that at the desired operating temperature the metal or the mixture of metals is liquid. In the circulation duct a circulation pump 32 is arranged, which is driven by an electric motor 33. It will be clear that the driving may also be effected through a transmission by the outgoing shaft of the hot-gas engine. The device further comprises a second container 17 which contains a medium which reacts with the metals in the circulation duct 31 with evolution of heat. The container 17 communicates with the circulation duct 31 through a duct 18.

The metal in the circulation dust 31 may be, for example, Li, Na, K, Mg, Al or one of the rare earth metals or combinations thereof. The choice of the metals is substantially determined by their melting temperature and their evolution of heat.

The medium in the container 17 may be oxygen, a halogen or a halogen-containing compound. Particularly carbon-fluoride compounds (Freons) can readily be used.

The heater system further comprises a third container 23 containing a medium for example, helium or argon, which reacts neither with the medium in the container 17 nor with the metal or mixture of metals and the reaction products formed in the circulation duct 31 respectively. The container 23 communicates through a duct 24 with a connecting point 25 in the duct 18. The point 25 lies between the cock 20 and the orifice of the duct 18 in circulation duct 31. In the container 23 a pressure is maintained which is higher than the pressure in the circulation duct 31. The circulation duct 31 comprises an exhaust duct 26 which communicates through a circulation pump 27 with the container 23. A cooler 28 is incorporated in the exhaust duct 26.

The operation of this heater system is as follows. In the containers 17 and 23 a pressure is maintained which is higher than the pressure in the circulation-duct 31. The metal in this duct has first been brought at a temperature at which it is liquid by supplying heat through the electric heating coils 35.

The medium from the two containers 17 and 23 collectively flows to the circulation duct 31. The medium from the container 17 will react with the liquid metal while the medium from the container 23 will flow without reaction with the liquid metal to the exhaust 26. In the cooler 28 this medium is cooled and then directed back to the container 23 by the pump 27. The advantage of this system is that on closing the cock 20 the metal cannot enter the duct 18. It would solidify therein because the duct is at a lower temperature and the device could not be started again.

If metal particles or metal vapour were carried along with the helium to the exhaust duct 26 this may give rise to difficulties because said metal particles and vapour respectively, reaching structural components at lower temperature, for example, the circulation pump 27 and electric motor 33, deposit on these components in a solid form. To prevent this a separator for said particles may be arranged in the supply duct. This separator is not shown but may be formed by a filter or by providing in the exhaust a material, for example, provided on a surface contacted by the flow, which has a gettering action for the metal particles so that these particles are caught. The receiving of metal particles and vapour respectively may also be effected on additionally cooled surfaces provided for this purpose.

Alternatively it is possible to supply the exhaust with a portion of the medium from the container 17. This medium will react with the metal particles and vapour respectively and form substances which can more easily be caught with filters. The remaining active medium supplied is then again conducted to the circulation duct.

If the gaseous medium is $C_4F_8$ and the metal is lithium the reaction products are solid and consist of lithium fluoride and carbon particles. If the gaseous medium is, for example, $ClF_3$, the reaction products are solid lithium fluoride and liquid lithium chloride. This at a temperature of approximately 840° C. which is a suitable operating temperature for the hot-gas engine.

The solid particles which are formed during the reaction will form a mixture with the molten metal. The volume of the reaction product is approximately equal to that of the metal which has participated in the reaction. In this case no reaction products need be conducted away.

A ready heat transmission between the liquid metal and the heater of the hot gas engine is ensured in that the liquid metal is continuously circulated along these pipes. This circulation further ensures a good mixing of the liquid metal and the reaction product, so that the medium coming from container 17 always can find enough metal to react with.

A further advantage of this system is that the location at which the hot gas engine is in heat exchange with the liquid metal is different from the location at which the medium from container 17 enters the circulation duct. This prevents excessive heating of the heater tubes of the hot gas engine. This also prevents "oxidation" of the heater tubes by the aggressive medium from container 17.

Furthermore, it is of much importance in this device that the metal bath can always be kept under a sufficient pressure with the helium pressure to ensure a ready operation of the circulation pump. If a vacuum would be formed in the circulation duct the pumping action would be lost.

In circumstances the circulation of the helium may be less desirable. Penetration of metal into the duct 18 may then be prevented all the same by providing a check valve at point 36 where the duct is warm. The container 23 can in that case be emitted.

In the reaction between a metal or a mixture of metals and oxygen, a halogen or a halogen-containing compound, a quantity of heat is evolved per unit of volume of the reaction substances which is a number of times larger than the quantity of heat which can be stored in conventional heat accumulators per unit of volume. Hence the heater system in which a chemical reaction occurs can have a considerably smaller volume and a lower weight that heat accumulator systems. The advantage that no gases of combustion need be conducted away is fully maintained. This is very important in relation to the pollution of air which forms a problem in large towns and mines. In addition, said chemical heater system may also be used in places where dissipation of gases of combustion is not readily possible as a result of high ambient pressure.

In FIG. 2 reference numeral 1 denotes a cylinder of a hot gas engine in which a piston 2 and a displacer 3 reciprocate. The piston 2 and the displacer 3 are connected to a driving mechanism (not shown) by a piston rod 4 and a displacer rod 5 in such manner that the piston and the displacer can move with a mutual phase difference. In operation the piston 2 together with the lower side of the displacer 3 varies the volume of a compression space 6 while the displacer varies the volume of an expansion space 7 with its top. The compression space 6 and the expansion space 7 communicate with one another through a cooler 8, a regenerator 9 and a heater 10. The heater 10 consists of a plurality of pipe sections 11 arranged longitudinally in a circle about a central axis and having one end open to an annular duct 12 and the other end open to the top portion of the regenerator 9. The annular duct 12 communicates with the expansion space 7 through ducts 13 which are located between the pipes 11. Between the heater 10 of the hot gas engine and the circulation duct 31 of the heater system according to FIG. 1 a medium circulates which transports the heat which is evolved in the circulation duct to the heater pipes. This transport medium is incorporated in a circulation system consisting of a chamber 40 located around the heater 10 of the hot-gas engine, a duct 41, a circulation pump 42, a heat exchanger 43 and a duct 44 which again communicates with the chamber 40. This duct contains a metal or mixture of metals, for example, NaK. In the heat exchanger 43 this metal is in heat exchanging relationship with the liquid metal or mixture of metals in the circulation duct 31 (which may be constructed as shown in FIG. 1.)

This construction has the advantage that in constructing the heater 10 the properties of the liquid in the circulation duct 31 varying during operation need not be taken into account. The properties of the liquid heat-transporting metal is not varied in the course of time and can be adequately chosen.

For the construction of the heat exchangers 43 one has more freedom, because in this case one is not restricted to the requirements of the hot-gas engine so that there a heat exchanger may be constructed which cooperates readily with the liquid in circulation duct 31.

What is claimed is:

1. A device for converting calorific energy into mechanical energy, particularly a hot-gas engine, comprising one or more spaces of a lower average temperature in which a working medium can be compressed, as well as one or more spaces of a higher average temperature communicating with the first-mentioned spaces in which the working medium can be expanded, a heat exchanger, preferably a regenerator, being arranged in the communication between each pair of those spaces, the said device further comprising a heater system for supplying heat to the working medium, characterized in that the heater system comprises at least one first container containing a metal or a mixture of metals which is liquid at the operating temperature of the working medium, the heater system further comprising at least one second container containing a medium which can react chemically with the liquid in the first container with evolution of heat in such manner that the reaction products are solid and/or liquid at the temperature and pressure prevailing in the first container, the second container communicating through a supply duct with the first container and the system further comprising a control device for the dosed supply of medium from the second container to the first container, whereas the first container is constructed as a circulation duct comprising a circulation pump for circulating the liquid metal and liquid mixture of metals respectively together with the reaction products formed, the metal and the mixture of metals respectively together with the reaction products being in heat exchanging relationship with the working medium of the device over part of said circulation duct.

2. A device as claimed in claim 1, characterized in that the duct for supplying medium from the second container opens into the circulation duct at a point remote from the part of the duct where the said heat exchange takes place.

3. A device as claimed in claim 1, characterized in that a space is present in the circulation duct over the metal and mixture of metals respectively present therein, which space is filled with a gas, for example, helium, which does not react chemically with the metals in question, means being provided for maintaining a given pressure in said space.

4. A device as claimed in claim 1, constructed as a hot-gas engine the heater of which is constructed as a pipe heater, characterized in that a further circulation duct is provided in which a metal or mixture of metals, for example, NaK, circulates, the heater pipes of the engine being bathed by the said liquid metal or mixture of metals and said metal or mixture of metals being in heat exchanging relationship with the liquid in the circulation duct at another place.

References Cited

UNITED STATES PATENTS

| 3,070,536 | 12/1962 | Taylor et al. | 122—32 X |
| 3,080,706 | 3/1963 | Flynn et al. | 60—24 |
| 3,325,318 | 6/1967 | Pauliukonis | 149—109 |
| 3,353,349 | 11/1967 | Percival | 60—24 X |

CARROLL B. DORITY, JR., *Primary Examiner.*

U.S. Cl. X.R.

60—37; 149—109; 122—21